(12) United States Patent
Muchinsky et al.

(10) Patent No.: US 11,048,754 B2
(45) Date of Patent: *Jun. 29, 2021

(54) USING SELF-INFORMATION SCORES FOR ENTITIES TO DETERMINE WHETHER TO PERFORM ENTITY RESOLUTION

(71) Applicant: International Business Machines Corporation, Armonk, NY (US)

(72) Inventors: Craig W. Muchinsky, Austin, TX (US); Scott Schumacher, Porter Ranch, CA (US); Edward B. Thorne, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 366 days.

This patent is subject to a terminal disclaimer.

(21) Appl. No.: 16/109,583

(22) Filed: Aug. 22, 2018

(65) Prior Publication Data

US 2018/0365338 A1 Dec. 20, 2018

Related U.S. Application Data

(63) Continuation of application No. 14/610,557, filed on Jan. 30, 2015, now Pat. No. 10,108,746, which is a
(Continued)

(51) Int. Cl.
*G06F 16/30* (2019.01)
*G06F 16/901* (2019.01)
(Continued)

(52) U.S. Cl.
CPC .......... *G06F 16/9024* (2019.01); *G06F 16/23* (2019.01); *G06F 16/24578* (2019.01); *G06F 16/285* (2019.01); *G06F 16/951* (2019.01)

(58) Field of Classification Search
CPC .. G06F 16/951; G06F 16/24578; G06F 16/23; G06F 16/9024; G06F 16/285
(Continued)

(56) References Cited

U.S. PATENT DOCUMENTS 5,701,460 A 12/1997 Kaplan et al.
5,706,503 A * 1/1998 Poppen .................. G01C 21/32
(Continued)

OTHER PUBLICATIONS

Bhattacharya, I. and L. Getoor, "Entity Resolution in Graphs", [online], [Retrieved on Nov. 27, 2013]. Retrieved from the Internet at <URL: http://drum.lib.umd.edu/bitstream/1903/4021/1/4758.pdf>, Oct. 27, 2005, Total 21 pp., (Noted: URL can not be enabled by clicking).
(Continued)

*Primary Examiner* — Kuen S Lu
(74) *Attorney, Agent, or Firm* — Konrad Raynes Davda & Victor LLP; David W. Victor

(57) ABSTRACT

Provided are a computer program product, system, and method to determine whether to perform entity resolution on vertices in an entity graph. A determination is made of pairs of records in a database having a relationship value satisfying a threshold. An entity relationship graph has a vertex for each of the records of the pairs and an edge between two vertices. Each vertex has a self-information score based on content in the record, an initial unique entity identifier, and an entity information score. For each subject vertex of the vertices, a determination is made of a target vertex directly connected to the subject vertex that has a highest entity information score and whether to set the subject vertex entity identifier and entity information score to the entity identifier and entity information score of the target vertex based on the target vertex self-information score.

21 Claims, 11 Drawing Sheets

Related U.S. Application Data continuation of application No. 14/326,485, filed on Jul. 9, 2014, now Pat. No. 9,946,808.

(51) Int. Cl.
*G06F 16/23* (2019.01)
*G06F 16/28* (2019.01)
*G06F 16/951* (2019.01)
*G06F 16/2457* (2019.01)

(58) Field of Classification Search
USPC .......................................................... 707/748
See application file for complete search history.

(56) References Cited

U.S. PATENT DOCUMENTS

| | | | |
|---|---|---|---|
| 5,991,758 | A | 11/1999 | Ellard |
| 6,038,538 | A | 3/2000 | Agrawal et al. |
| 6,266,804 | B1 | 7/2001 | Isman |
| 6,643,658 | B1 | 11/2003 | Jai et al. |
| 7,027,582 | B2 | 4/2006 | Khello et al. |
| 7,523,117 | B2 | 4/2009 | Zhang et al. |
| 7,617,194 | B2 | 11/2009 | Liu et al. |
| 7,627,550 | B1 | 12/2009 | Adams et al. |
| 7,685,093 | B1 | 3/2010 | Adams et al. |
| 7,698,268 | B1 | 4/2010 | Adams et al. |
| 7,809,548 | B2 | 10/2010 | Mihalcea et al. |
| 7,882,105 | B2 | 2/2011 | Laugier et al. |
| 7,900,052 | B2 | 3/2011 | Jonas |
| 8,010,521 | B2 | 8/2011 | Kissner et al. |
| 8,161,048 | B2 | 4/2012 | Procopiuc et al. |
| 8,229,883 | B2 | 7/2012 | Brauer et al. |
| 8,321,383 | B2 | 11/2012 | Schumacher et al. |
| 8,326,847 | B2 | 12/2012 | Balmin et al. |
| 8,438,189 | B2 | 5/2013 | Andersen et al. |
| 8,533,182 | B1 | 9/2013 | Charboneau |
| 8,965,848 | B2 | 2/2015 | Caceres |
| 9,009,029 | B1 | 4/2015 | Michalak et al. |
| 9,727,664 | B2 | 8/2017 | Luo et al. |
| 9,946,808 | B2 | 4/2018 | Muchinsky et al. |
| 2003/0158850 | A1* | 8/2003 | Lawrence ............. G06F 16/313 |
| 2006/0112133 | A1* | 5/2006 | Ljubicich ............ G06F 16/9024 |
| 2008/0098375 | A1 | 4/2008 | Isard |
| 2008/0243832 | A1 | 10/2008 | Adams et al. |
| 2008/0243885 | A1 | 10/2008 | Harger et al. |
| 2009/0030916 | A1 | 1/2009 | Andersen et al. |
| 2009/0089332 | A1 | 4/2009 | Harger et al. |
| 2010/0095374 | A1 | 4/2010 | Gillum et al. |
| 2010/0114877 | A1 | 5/2010 | Adams et al. |
| 2010/0174725 | A1 | 7/2010 | Adams et al. |
| 2010/0189316 | A1 | 7/2010 | Walch |
| 2010/0281078 | A1 | 11/2010 | Wang et al. |
| 2010/0312774 | A1 | 12/2010 | Dmitriev et al. |
| 2011/0047167 | A1 | 2/2011 | Caceres |
| 2013/0054598 | A1 | 2/2013 | Caceres |
| 2013/0246328 | A1 | 9/2013 | Sweeney et al. |
| 2014/0331277 | A1* | 11/2014 | Frascadore ........... H04L 63/104 726/1 |
| 2015/0161228 | A1* | 6/2015 | Davies .................. G06F 16/285 707/737 |
| 2015/0254329 | A1 | 9/2015 | Agarwal et al. |

OTHER PUBLICATIONS

Chen, Z., D.V. Kalashnikov, and S. Mehrotra, "Adaptive Graphical Approach to Entity Resolution", [online], [Retrieved on Nov. 27, 2013]. Retrieved from the Internet at <URL: http://www.ics.uci.edu/~dvk/pub/JCDL07_dvk.pdf>, ACM, 2007, Total 10 pp., (Noted: URL can not be enabled by clicking).

Niu, L., J. Wuy, and Y. Shiz, "Entity Resolution with Attribute and Connection Graph", [online], [Retrieved on Nov. 27, 2013]. Retrieved from the Internet at <URL: http://ieeexplore.ieee.org/xpl/articleDetails.jsp?arnumber=6137389>, 2011 11th IEEE International Conference on Data Mining Workshops, © 2007 IEEE, Total 5 pp., (Noted: URL can not be enabled by clicking).

Nuray-Turan, R., D.V. Kalashnikov, and S. Mehrotra, "Adaptive Connection Strength Models for Relationship-Based Entity Resolution", © 2013 ACM, ACM Journal of Data and Information Quality, vol. 4, No. 2, Article 8, Publication date: Mar. 2013, Total 22 pp.

U.S. Appl. No. 14/326,485, filed Jul. 9, 2014, entitled "Using Vertex Self-Information Scores for Vertices in an Entity Graph to Determine Whether to Perform Entity Resolution on the Vertices in the Entity Graph", invented by C.W. Muchinsky et al., Total 37 pp. [57.337 (Appln)].

U.S. Appl. No. 14/610,557, filed Jan. 30, 2015, entitled "Using Vertex Self-Information Scores for Vertices in an Entity Graph to Determine Whether to Perform Entity Resolution on the Vertices in the Entity Graph", invented by C.W. Muchinsky et al., Total 37 pp. [57.337C1 (Appln)].

Preliminary Amendment, dated Jan. 30, 2015, for U.S. Appl. No. 14/326,485, filed Jul. 9, 2014 by C.W. Muchinsky et al., Total 8 pp. [57.337 (PrelimAmend)].

Office Action 1, dated Jul. 28, 2016, for U.S. Appl. No. 14/326,485, filed Jul. 9, 2014 by C.W. Muchinsky et al., Total 20 pp. [57.337 (OA1)].

Response to Office Action 1, dated Oct. 28, 2016, for U.S. Appl. No. 14/326,485, filed Jul. 9, 2014 by C.W. Muchinsky et al., Total 12 pp. [57.337 (ROA1)].

Final Office Action, dated Feb. 9, 2017, for U.S. Appl. No. 14/326,485, filed Jul. 9, 2014 by C.W. Muchinsky et al., Total 21 pp. [57.337 (FOA)].

Response to Final Office Action, dated May 8, 2017, for U.S. Appl. No. 14/326,485, filed Jul. 9, 2014 by C.W. Muchinsky et al., Total 13 pp. [57.337 (RFOA)].

Notice of Allowance 2, dated Dec. 6, 2017, for U.S. Appl. No. 14/326,485, filed Jul. 9, 2014 by C.W. Muchinsky et al., Total 11 pp. [57.337 (NOA2)].

Office Action 1, dated Oct. 27, 2017, for U.S. Appl. No. 14/610,557, filed Jan. 30, 2015 by C.W. Muchinsky et al., Total 38 pp. [57.337C1 (OA1)].

Response to Office Action 1, dated Jan. 29, 2018, for U.S. Appl. No. 14/610,557, filed Jan. 30, 2015 by C.W. Muchinsky et al., Total 12 pp. [57.337C1 (ROA1)].

Notice of Allowance, dated Jun. 7, 2018, for U.S. Appl. No. 14/610,557, filed Jan. 30, 2015 by C.W. Muchinsky et al., Total 14 pp. [57.337C1 (NOA)].

List of IBM Patents or Patent Applications Treated as Related, Total 2 pp., Aug. 22, 2018.

\* cited by examiner

Vertex Information

Edge

USING SELF-INFORMATION SCORES FOR ENTITIES TO DETERMINE WHETHER TO PERFORM ENTITY RESOLUTION

BACKGROUND OF THE INVENTION

1. Field of the Invention

The present invention relates to a computer program product, system, and method for using vertex self-information scores for vertices in an entity graph to determine whether to perform entity resolution on the vertices in the entity graph.

2. Description of the Related Art

Entity resolution refers to techniques to determine whether different records with different data in a database that have unique identifiers may in fact comprise the same real world entity. To compare data records in a database to determine a relationship value of the records, the database server may have to pair wise compare each possible pair of records. An entity graph may then be formed where records that are determined to have a relationship value satisfying a threshold are shown as vertices linked by an edge indicating the relationship among the entities. The resulting entity graph may have vertices indirectly linked along edges. The entity graph may be used to perform entity resolution to determine if two vertices representing different records are in fact the same entity. For instance, if two records are determined to be related, then they may be updated to indicate the same entity. Various other techniques may be used to determine entity relationship using the graph.

There is a need in the art for improved techniques to perform entity resolution on an entity graph.

SUMMARY

Provided are a computer program product, system, and method for using vertex self-information scores for vertices in an entity graph to determine whether to perform entity resolution on the vertices in the entity graph. A determination is made of pairs of records in the database having a relationship value satisfying a threshold. An entity relationship graph is generated having a vertex for each of the records of the pairs and an edge for each of the determined pairs between two vertices representing records in one of the determined pairs. Each vertex is associated with a self-information score based on content in the record represented by the vertex and is assigned an initial unique entity identifier and an entity information score. For each subject vertex of the vertices, a determination is made of a target vertex directly connected to the subject vertex that has a highest entity information score of at least one vertex directly connected to the subject vertex that has an entity information score greater than the entity information score of the subject vertex. A determination is made as to whether to set the subject vertex entity identifier and entity information score to the entity identifier and entity information score of the target vertex based on the target vertex self-information score.

DETAILED DESCRIPTION

Described embodiments provide techniques to perform entity resolution among vertices in an entity graph representing records in a database. With described embodiments, vertices representing records may consider a self-information score of a directly linked vertex to determine whether update its entity information to that of the linked vertex, if the vertex representing the entity is indirectly linked.

Figure 1:
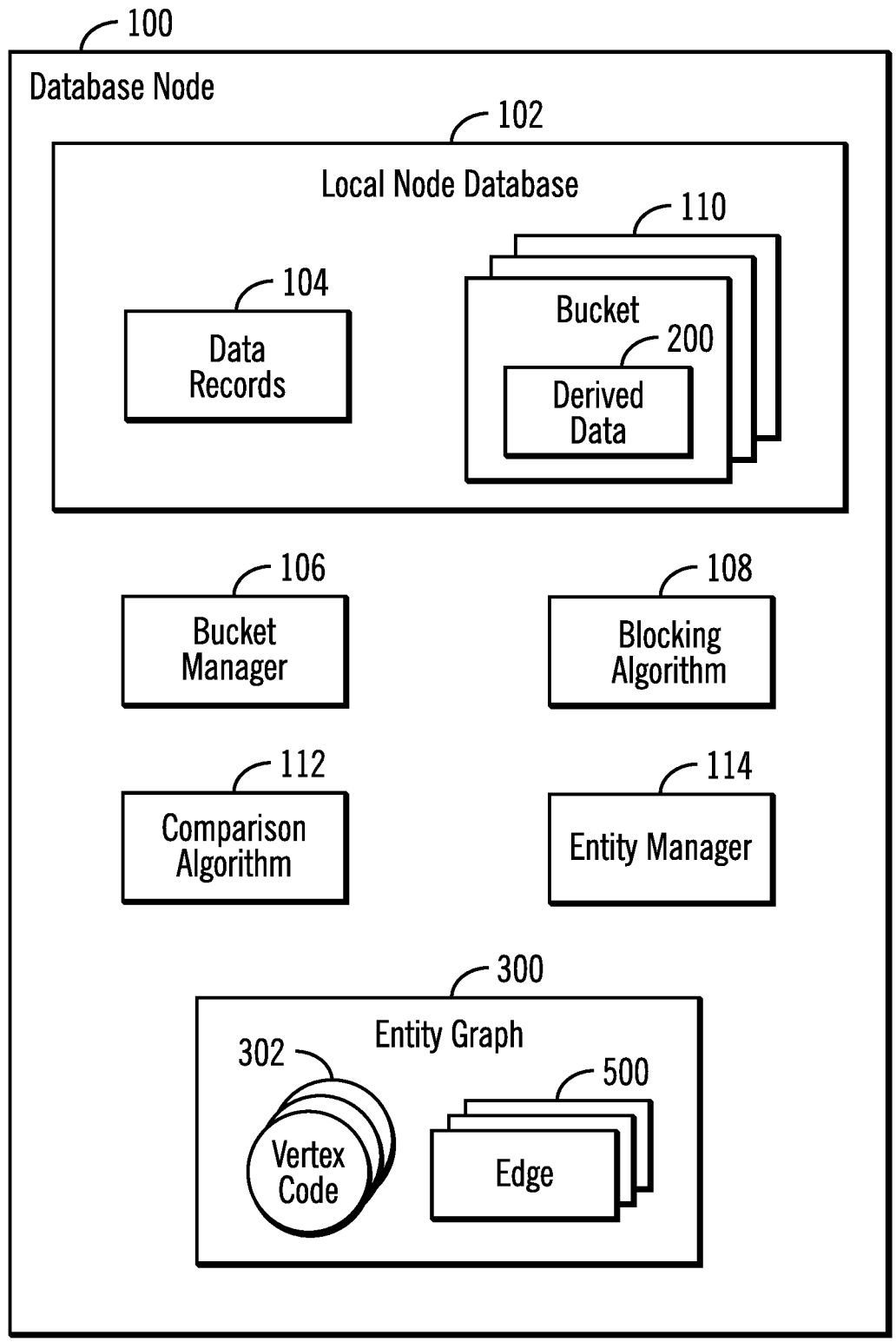
FIG. 1 illustrates an embodiment of a database node.

FIG. 1 illustrates an embodiment of a database node 100, which may be a sole node or in a distributed database environment. A host (not shown) may communicate input in the form of updates and data to the records in the database The database node may include a local database 102 to store records 104, a bucket manager 106 to generate derived data 200 that comprises a compressed format of the record including metadata on the record, where the derived data 200 may include only some or all of the content from those fields of the record 104 needed to compare with other records to determine a relationship value. In this way, the derived data 200 may not include data from all fields, only those fields needed for comparison purposes to determine a relationship value.

The bucket manager 106 may apply a blocking algorithm 108 to assign data records to buckets 110 based on attributes of the record or derived data 200 of the record 104 matching attributes of the bucket 110. Bucket attributes may be stored with metadata for the bucket 110. The bucket manager 106 may then invoke a comparison algorithm 112 to pair wise compare every record in one bucket 110 with every other record in that same bucket using the derived data 200 to generate a relationship value between every pair of records. An entity manager 114 groups records 104 that are resolved or determined to refer to the same real world entity. The entity manager 114 may determine records within one bucket 110 that are in fact the same entity by generating an entity graph 300 comprised of vertices representing records 104 where vertices that have a relationship satisfying a criteria are connected by edges or directly linked. Each vertex may be implemented with vertex code 302 having code to perform vertex operations and interact with other vertices to determine whether different records represent the same entities. Edges 500 represent two vertices that are connected, which means their comparison relationship value exceeds a threshold.

Figure 2:
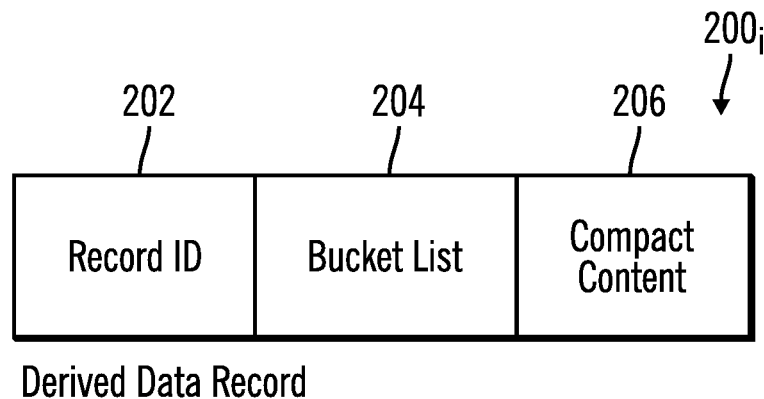
FIG. 2 illustrates an embodiment of a derive data record.

FIG. 2 illustrates an embodiment of a derived data record $200_i$ comprising an instance of the derived data 200, including a record identifier (ID) 202 identifying a record 104, a bucket list 204 indicating a bucket 110 in which the record 202 is grouped, and compact content 206 comprising a portion of the content of the record 104 that is used by the comparison algorithm 112 to compare records. The compact content 206 may include a subset of the fields of the record 202, such as only those fields used by the comparison algorithm 112, and may include an abbreviated format of the included fields. In this way, the derived data $200_i$ provides a compact representation of the record 202.

To perform entity resolution and determine records 104 that comprise a same entity, the entity manager 112 may use a graphical approach to entity resolution and generate a graphical representation 120 of the records 104 in one bucket 110 that are in pair wise relationships with other records and that are indirectly or directly connected.

Figure 3:
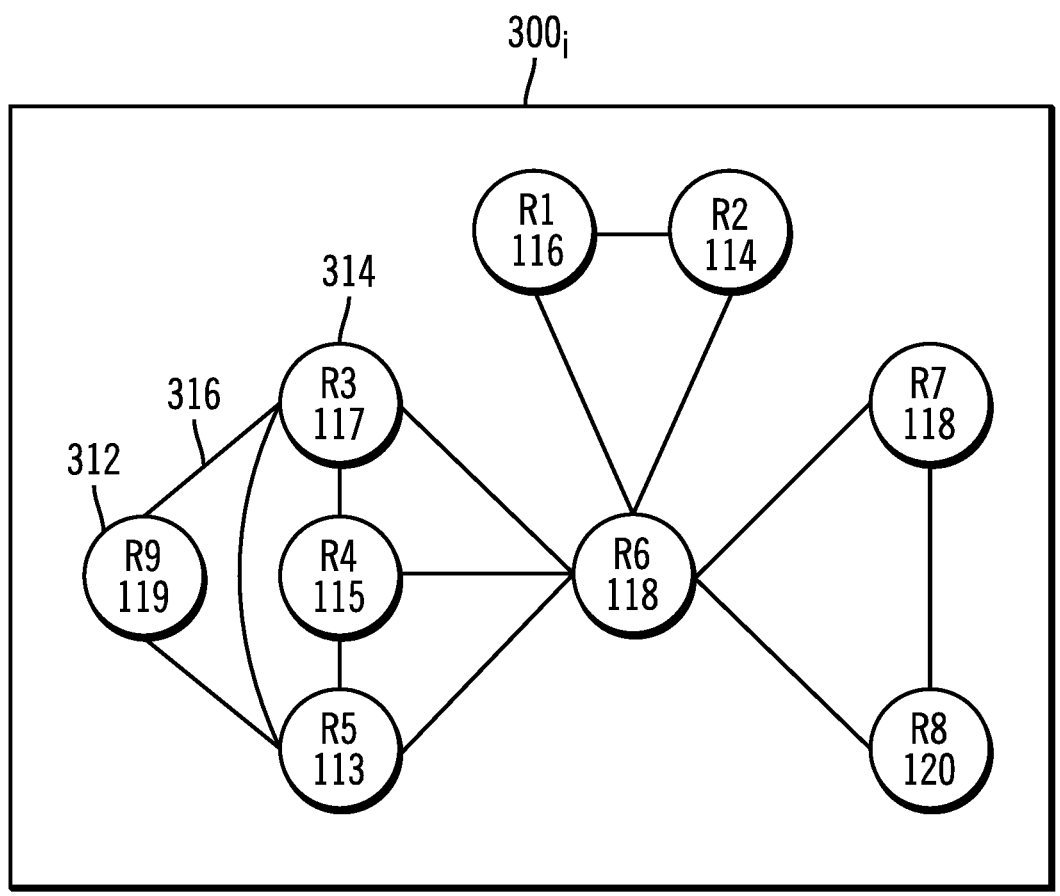
FIG. 3 illustrates an example of an entity graph.

FIG. 3 illustrates an instance of an entity graph $300_i$, where the records are represented as vertices in the graph 300, e.g., 312, 314 and are directly or indirectly connected by edges, e.g., 316, between the vertices, where an edge indicates two records that have a relationship value resulting from the comparison algorithm 112 exceeding a threshold indicating the records are related. Each vertex represents a record 104, connected by edges, where an edge, e.g., 316, between two of the vertices 312, 314 indicates a relationship value between the vertices. Each vertex may be implemented with vertex code 302 to perform vertex operations.

Figure 4:
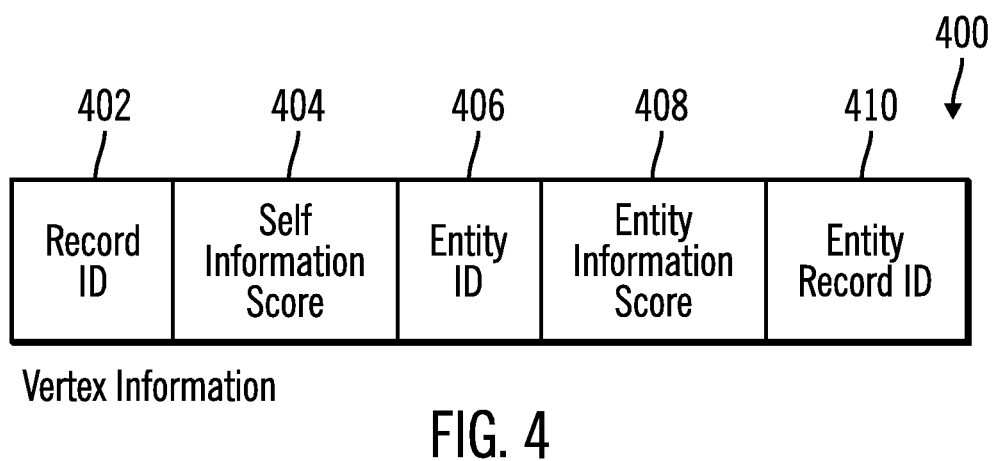
FIG. 4 illustrates an embodiment of vertex information for vertices in the entity graph.
Figure 5:
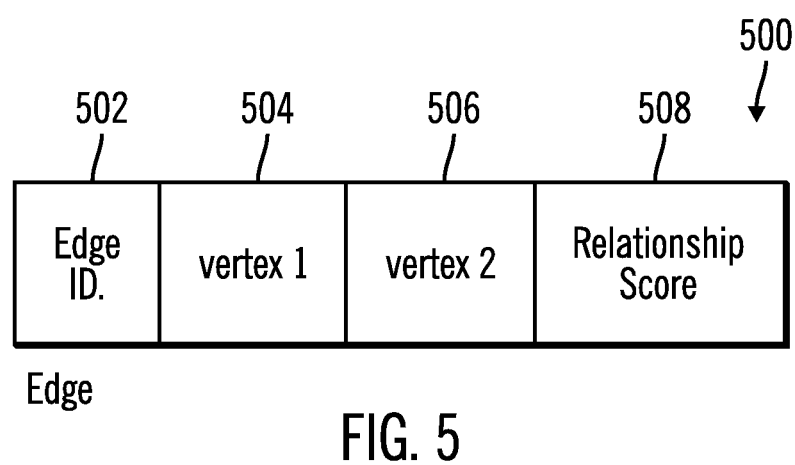
FIG. 5 illustrates an embodiment of edge information for edges between vertices in the entity graph.

FIG. 4 illustrates an embodiment of vertex information 400 for each vertex 302 in the graph including a record identifier 402 identifying the record represented by the vertex 400; a self-information score 404 of the record that is calculated based on the strength of the compact 206 or full content of the record 402, such as an entropy value calculated using an entropy measurement technique; an entity identifier 406 identifying an entity that is assigned to the record vertex 400; an entity information score 408 comprising the information score for the entity record, which comprises the record 104 that has a self-information score 404 equaling the entity information score 408, such as the vertex that is a member of the entity group having a largest self-information score, where the entity record is effectively the proxy or representative record for the entity; and an entity record identifier 410 identifying the entity record. The entity record 410 comprises the record having a self-information score 404 equal to the entity information score, i.e., is the entity to which other vertices/records are resolved FIG. 5 illustrates an embodiment of an edge 500 between two vertices 400i, 400j in the graph 300, and includes an edge identifier 502, two vertices 504 and 506 directly linked by the edge 502, and a relationship score 508 calculated by the comparison algorithm 112 when doing the pair wise comparison of the records 104.

Figure 6:
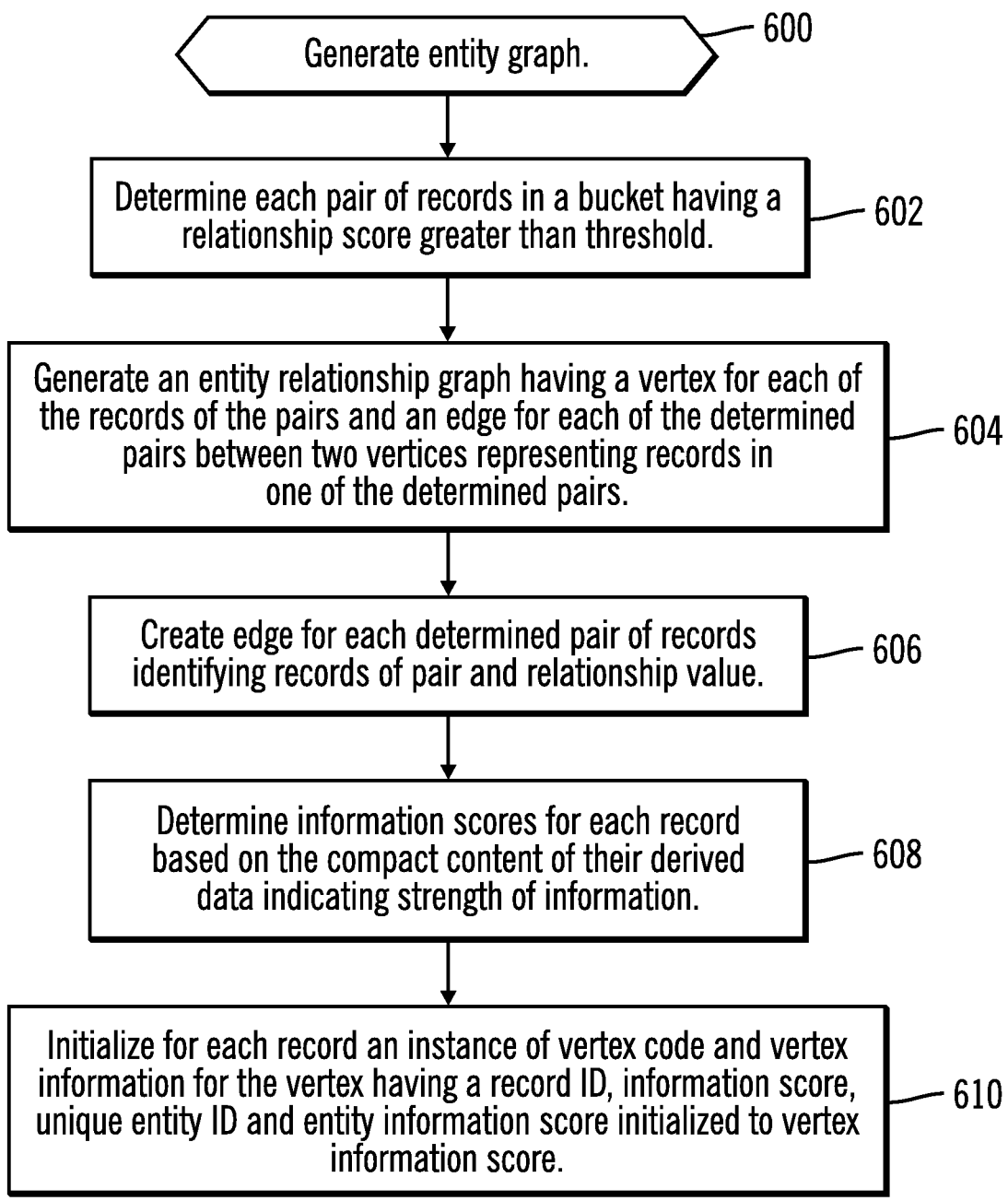
FIG. 6 illustrates an embodiment of operations to generate an entity graph.

FIG. 6 illustrates an embodiment of operations performed by the entity manager 114 to create an entity graph 300 that can be used to perform entity resolution. Upon initiating (at block 600) generating the entity graph 300, the entity manager 114 determines (at block 602) each pair of records 104 in a bucket 110 having a relationship score, as determined by the comparison algorithm 112, that is greater than a relationship threshold. An entity relationship graph 300 is generated (at block 604) having a vertex 302 for each of the records of the pairs in a bucket and an edge 500 for each of the determined pairs between two vertices representing records in one of the determined pairs. The created edge 500 identifies (at block 606) the records 504, 506 of the pair and a relationship value 508. The entity manager 114 determines (at block 608) information scores for each record based on the compact content of their derived data indicating strength of the information in the record. The entity manager 114 initializes (at block 610) for each record 104 an instance of vertex code 302 and vertex information 400 for the vertex having a record ID 402, information score 404, unique entity ID 406 and entity information score 408 initialized to the vertex information score 404.

The result of the operations of FIG. 6 is an entity graph 300 having vertex code 302 and vertex information 400 for each record 104 grouped in the bucket 110 and an edge 304 between each two vertices representing records having a relationship score satisfying a threshold. The vertex code 302 implementing the vertices in the graph 300 may communicate with each other and the entity manager 114 to adjust the graph to resolve entity relationships among the records.

Figure 7:
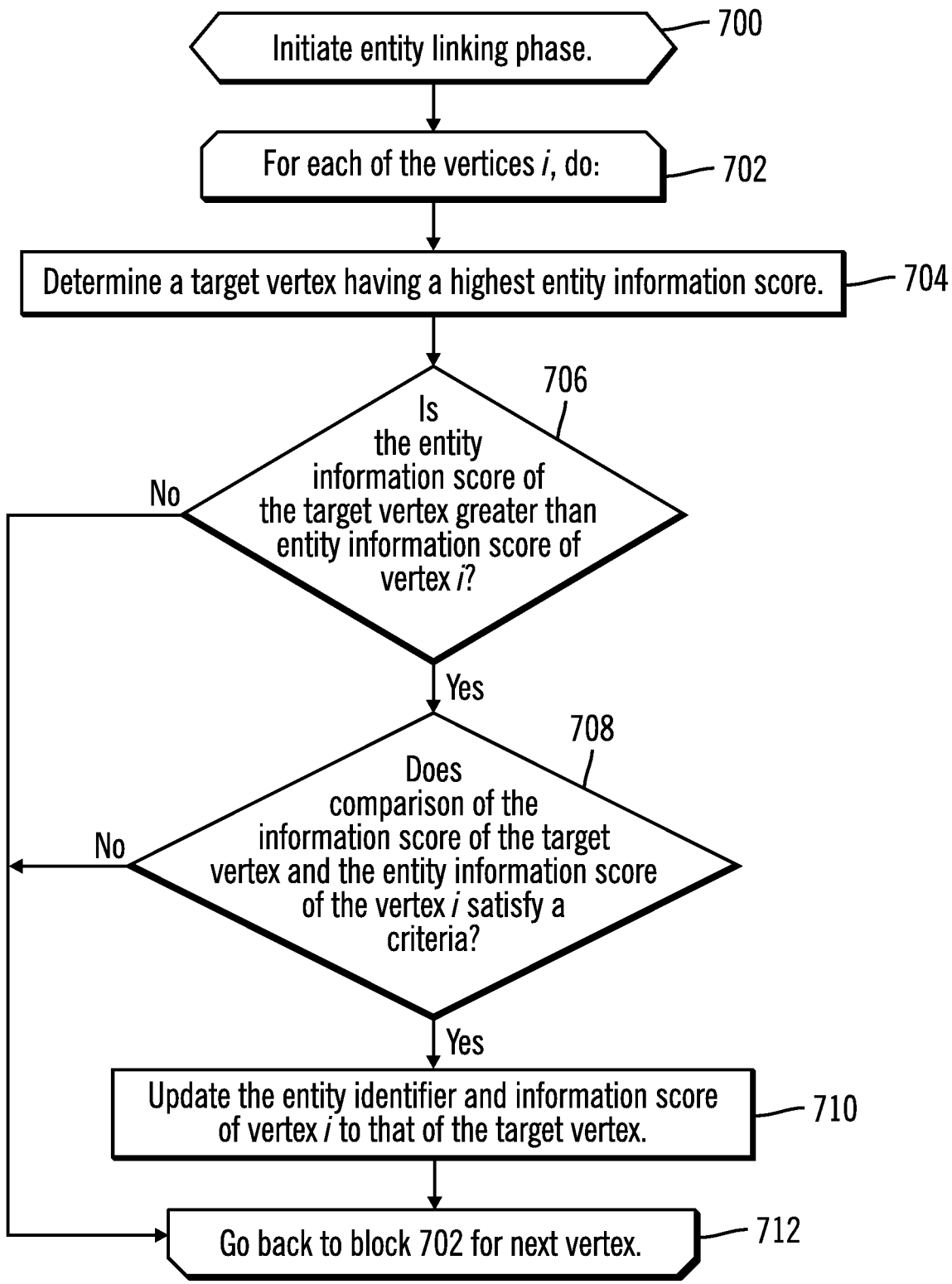
FIG. 7 illustrates an embodiment of operations to link vertices to a common entity.

FIG. 7 illustrates an embodiment of operations performed by the entity manager 114 and/or the vertex 302 code to assign vertices representing records to entities of a related vertex because the relatedness of the records/vertices indicates they may be the same entity. Upon initiating an entity linking phase (at block 700), a loop of operations is performed between blocks 702 and 712 for each generated vertex i in the graph 300. At block 704, a target vertex is determined comprising the directly linked vertex having the highest entity information score 408 if there are multiple directly linked vertex. If (at block 706) the entity information score 408 of the target vertex is greater than the entity information score 408 of subject vertex i, then a comparison is made (at block 708) to determine whether of the self-information score of the target vertex and the entity information score of the subject vertex i satisfy a criteria to determine whether the strength of the target vertex is sufficient to change the entity information 406, 408, 410 to that of the target vertex. In one embodiment, the comparison may comprise determining whether the self information score 404 of the target vertex is less than then the subject vertex i entity information score 408 minus a threshold. This makes sure that a very weak target vertex having a relatively low information score 404 relative to the entity score of the subject vertex does not cause the subject linked vertex i to change its entity to that of an indirectly linked entity record linked through the target vertex. The stronger the information score 404 of the target vertex, the more likely the vertex i will change its entity information score 408 to the higher entity information score entity of the target vertex, where the target vertex entity record is directly or indirectly linked to the target vertex. Further, changing the entity information score 404 of the indirectly linked vertex i, will cause the change of the entity information score 404 at all vertices having the common entity ID 406 and entity information score 408 of the subject vertex i.

If (at block 708) the criteria is satisfied, then the entity identifier 406 and entity information score 408 of vertex i is updated (at block 710) to that of the target vertex, which may also cause all the update of the entity information 406, 408 for all vertices having the same entity ID 406 and score 408 as the vertex i before it is updated. If the conditions are not satisfied at block 706 or 708 or after updating the entity identifier, from block 710, control proceeds to consider any further vertices in the entity graph 300.

Further rules to consider in order to update a subject vertex entity information 406, 408, 410 may involve checking whether the subject vertex being considered for updating is the same record as the entity record 410 of the target vertex. In such case, the subject vertex represents the entity record of the target vertex so no update is needed. If the subject vertex has an entity information score 408 the same as that of the target vertex, then there are two entities having the same score, and the subject vertex has its entity ID 406 and entity record ID 410 updated to the smallest entity ID 406 of the subject vertex and the target vertex.

Figure 8:
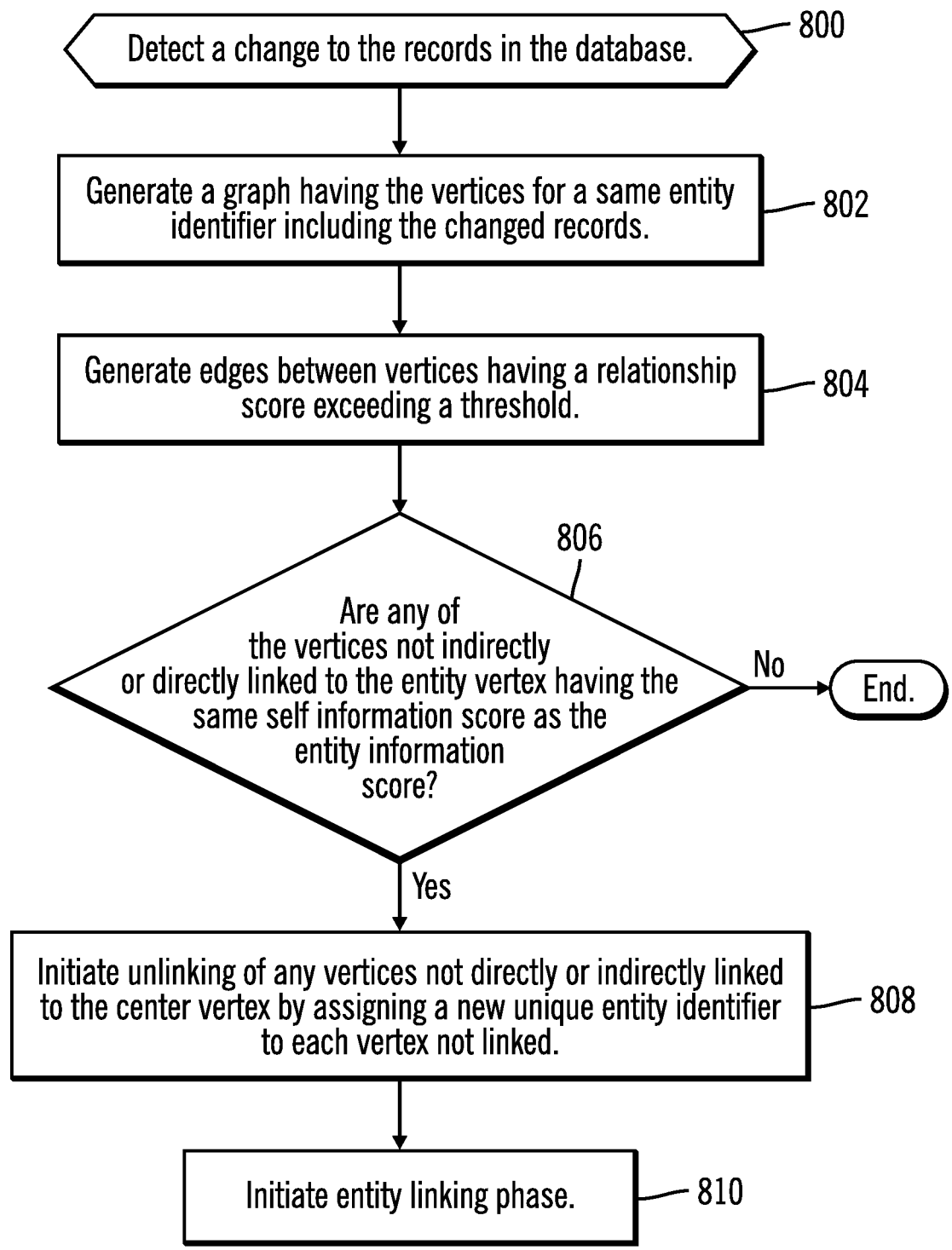
FIG. 8 illustrates an embodiment of operations to perform entity unlinking.

FIG. 8 illustrates an embodiment of operations performed by the entity manager 114 and/or the vertex 302 code to unlink vertices in an entity graph 300 that are determined to no longer be in an entity group. Upon detecting (at block 800) a change to the entity scores or information in one of the records 104 in the database 102, the entity manager 114 generates (at block 802) a graph 300 having vertices 302, 400 for each of the records 104 having a same entity identifier 410 as the changed records. Edges 304 are generated (at block 804) between vertices having a relationship score exceeding a threshold. Two records previously having a relationship score exceeding the threshold may now have a relationship score below the threshold, thus meaning that they are no longer linked. If (at block 806) any of the vertices are not directly or indirectly linked to the entity vertex, comprising the vertex having the same self information score 404 as the entity information score 408, then vertices not directly or indirectly linked to the entity vertex are unlinked (at block 808) by assigning a new unique entity identifier to each vertex not linked and control proceeds (at block 810) to an entity linking phase of FIG. 7 to consider whether to update the entity information for those vertices having their entity IDs 408 assigned a new unique entity identifier. When assigning a new entity ID 406 to the vertex information 400 for a vertex, the entity information score 408 would be updated to the self information score 404 of the vertex and the entity record ID 410 would be set to the record ID 402 for the vertex. If (at block 806) all vertices are directly or indirectly linked, then control ends.

Figure 9:
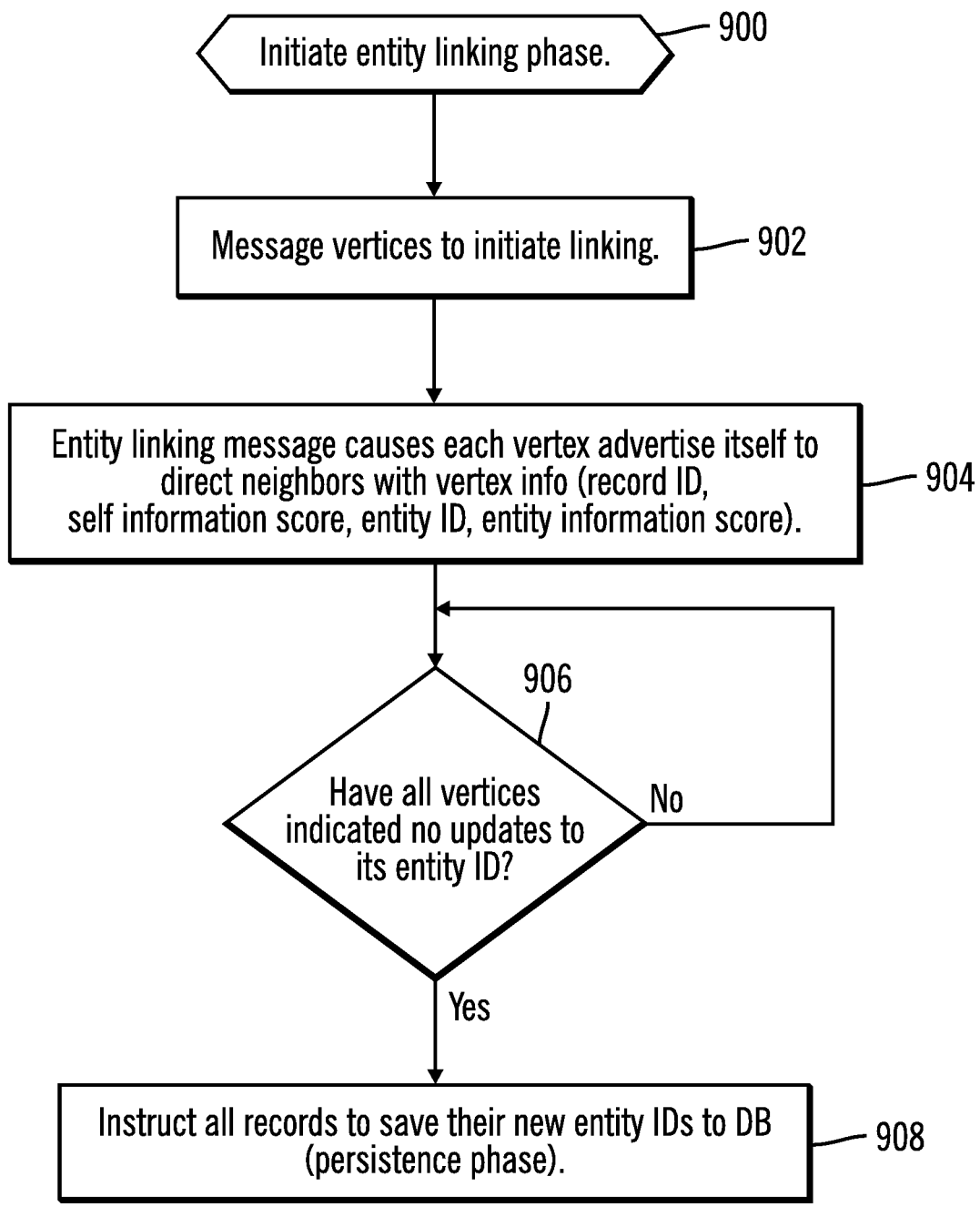
FIG. 9 illustrates an embodiment of operations to initiate an entity linking phase using messages among vertices.

FIG. 9 illustrates an alternative embodiment to link vertices in the graph 300 as performed by the vertex code 302 and the entity manager 114 using messaging between the vertices. Upon initiating (at block 900) the entity linking phase, the entity manager 114 messages (at block 902) an entity linking message to the vertices 302 in the graph 300 to initiate linking. This entity linking message causes the vertex code 302 for each vertex to send (at block 904) an advertisement to its directly linked neighbors along an edge 304 including its vertex information, including the record ID 406, self information score 404, entity ID 406, entity information score 408, and entity record ID 410. This message the vertices send to their neighbors causes the neighbors to determine whether they will update their entity information 406, 408, 410 to that of the neighbor sending the message. If (at block 906), after sending the entity linking message, the entity manager 114 determines that all vertices have indicated that they have not updated their entity information, then the linking phase ends and the entity manager 114 instructs (at block 908) all the vertices 302 to save their new entity IDs to their corresponding data records 104 in the database 110 as part of a persistence phase. Otherwise, if (at block 906) not all vertices have indicated they have not updated entity information 406, 408, 410, then control proceeds back to block 906 to wait until all vertices have not updated their entity information.

Figure 10:
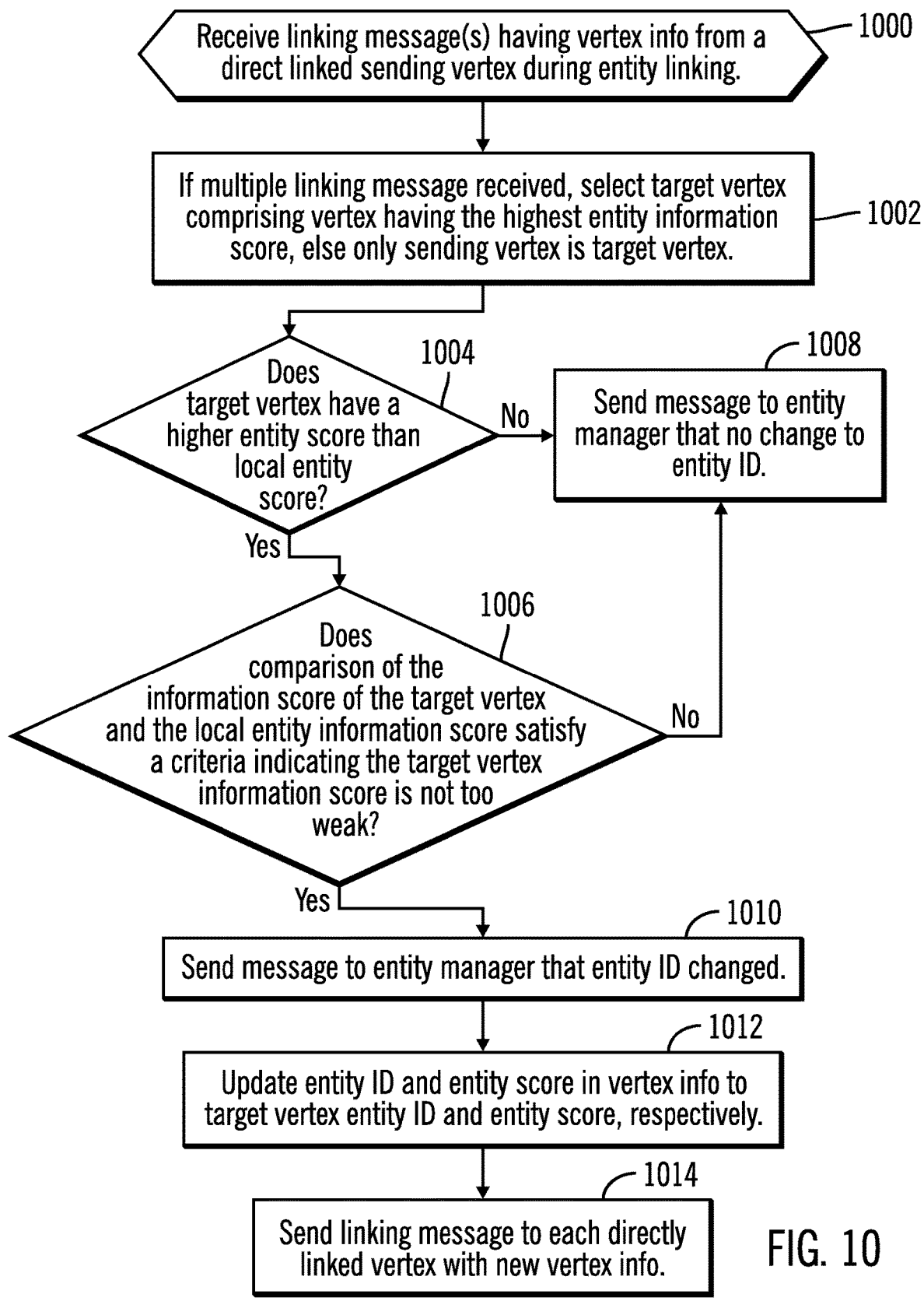
FIG. 10 illustrates an embodiment of operations to link vertices in response to messages from vertices.

FIG. 10 illustrates an embodiment of operations performed by the vertex code 302 implementing each of the vertices to process a linking message from a directly linked sending vertices on an edge 304. Upon receiving (at block 100) one or more linking messages, a target vertex is selected (at block 1002), such that if there are multiple linking messages received, the selected target vertex comprises the vertex having the highest entity information score 408, else the only sending vertex is the target vertex. If (at block 1004) the target vertex does have a higher entity score 408 than the local entity score 408 at the receiving vertex, then a comparison is made (at block 1006) of the information score 404 of the target vertex and the local entity information score 408 to determine whether a criteria is satisfied indicating whether target vertex information score is too weak to be used to change the entity information score of the receiving vertex. As mentioned, the criteria may comprise determining whether the target vertex information score 404 is less than the local entity information score 408 minus a threshold.

If (at block 1006) the target vertex information score 404 is not less than, i.e., greater than, the local entity information score less the threshold, then the receiving vertex 302 sends (at block 1010) a message to the entity manager indicating that the entity ID 406 has changed. The receiving vertices entity information 406, 408, 410 is updated (at block 1012) to that of the target vertex entity information 406, 408, 410. The receiving vertex then sends (at block 1014) a linking message to each directly linked vertex with the new updated vertex information 400, which may cause the receiving vertices to update their entity information according to the operations of FIG. 10.

If (at block 1004) the target vertex does not have a higher entity score or if the comparison does not satisfy the threshold, i.e., the target vertex is too weak, then a message is sent (at block 1008) to the entity manager 114 that there is no change to the entity information 406, 408, 410 of the receiving vertex.

With the operations of FIG. 10, the vertex code 302 implemented at each vertex sends messages of changed information and responds to changed information from other linked vertices by determining whether to update the local entity information 406, 408, 410.

Figure 11:
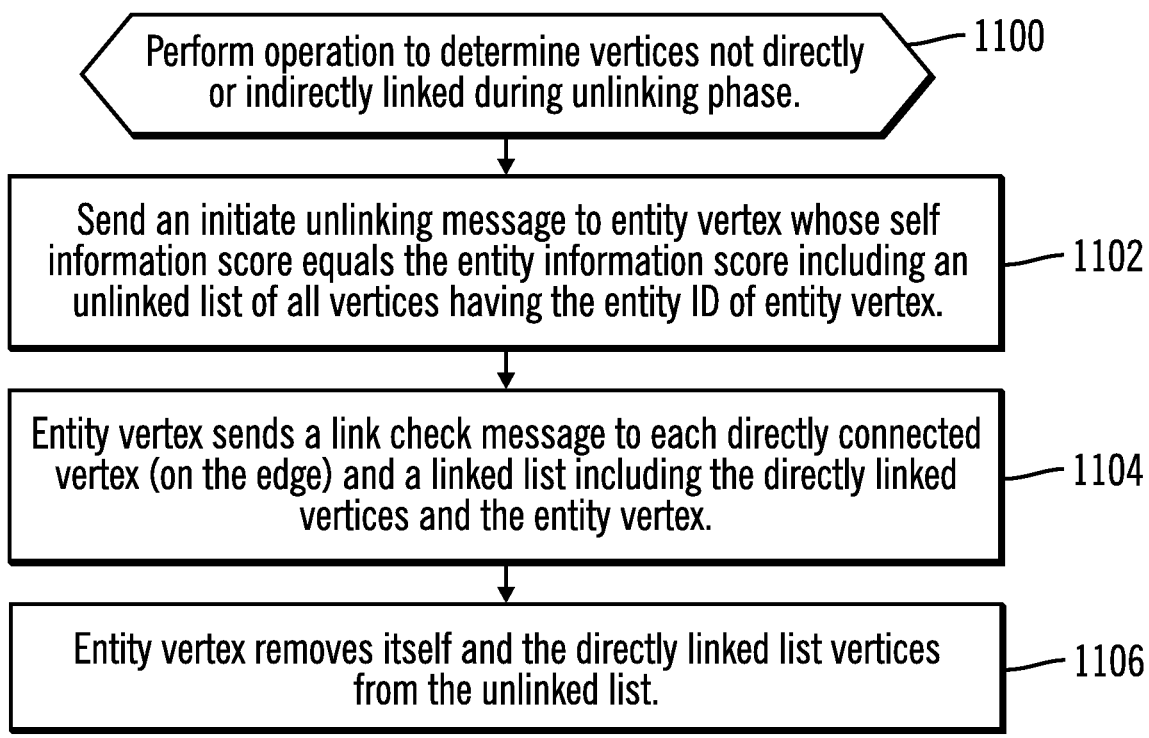
FIGS. 11, 12, 13, and 14 illustrate an embodiment of operations to unlink vertices using messages among vertices.

FIG. 11 illustrates an embodiment of operations performed by the entity manager 114 and vertex code 302 to perform the unlinking phase using messaging among the vertices in the graph 300 implemented with vertex code 300. Upon initiating (at block 1100) the determination to determine whether to unlink vertices from other vertices having a common entity ID, the entity manager 114 sends (at block 1102) an initiate unlinking message to an entity vertex comprising the vertex having the common entity ID 406 and information score 48 whose self-information score 404 equals the entity information score 408. This message includes an unlinked list of all vertices having the entity ID of the entity vertex which have not been checked to determine whether they are linked to the entity vertex. The entity vertex sends (at block 1104) a link check message to each directly connected vertex (on the edge), where the message includes a linked list including the directly linked vertices and the entity vertex. The entity vertex removes (at block 1106) itself and the directly linked vertices from the unlinked list.

Figure 12:
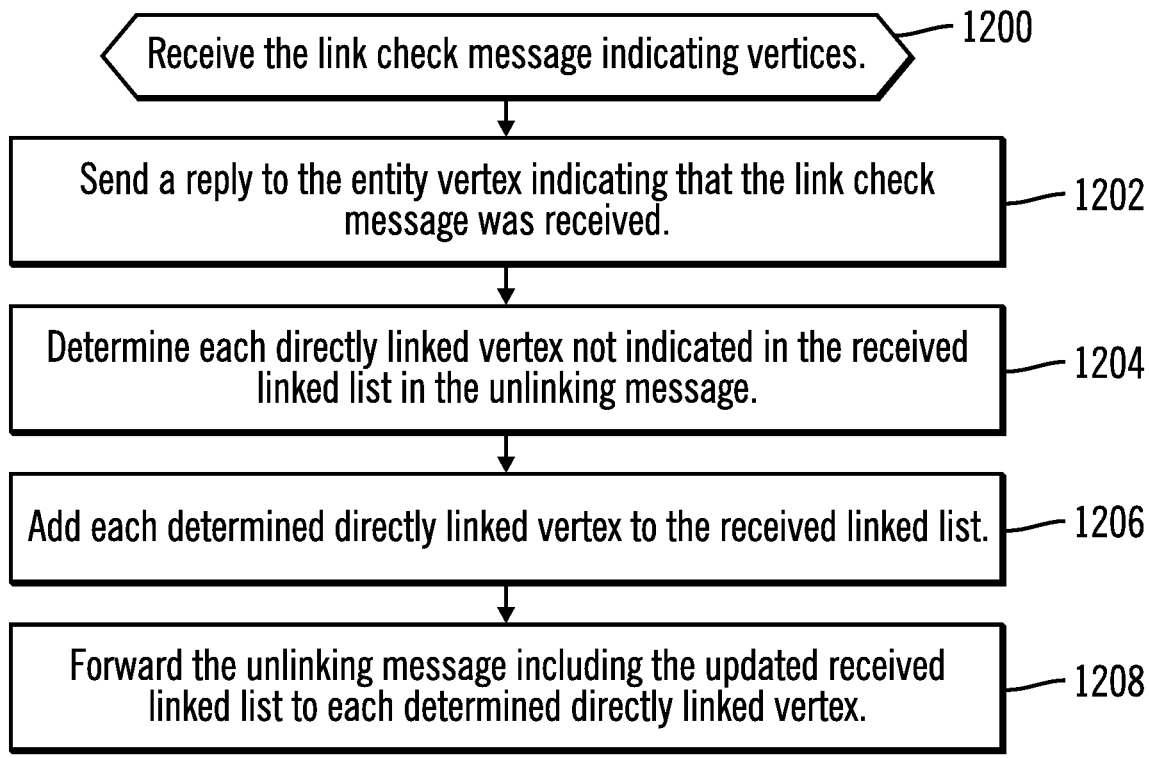

FIG. 12 illustrates an embodiment of operations performed by the vertex code 302 for a vertex to process a link check message having the linked list indicating vertices that are linked and have received the message. Upon receiving (at block 1200) the link check message from a directly connected vertex, the receiving vertex sends (a block 1202) to the entity vertex indicating that the link check message was received. The receiving vertex then determines (at block 1204) each directly linked vertex not indicated in the forwarded linked list in the unlinking message and adds (at block 1206) each determined linked vertex to the received linked list. The receiving vertex then forwards (at block 1208) the unlinking message including the updated received linked list to each determined directly linked vertex. The directly linked vertices receiving the forwarded unlinking message would then perform the operations of FIG. 12.

Figure 13:
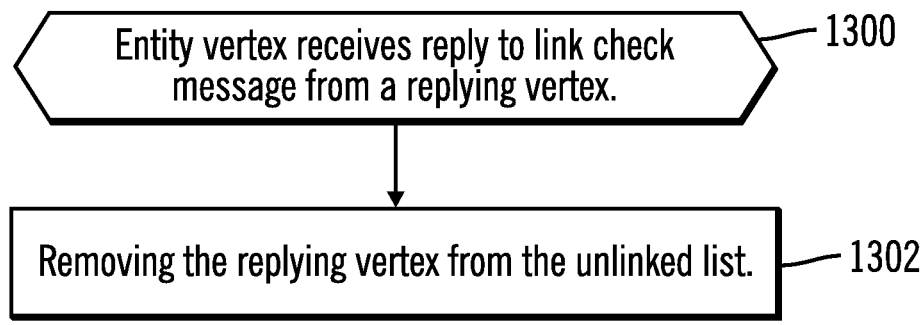

FIG. 13 illustrates an embodiment of operations performed by the vertex code 302 implemented for the entity vertex to process a reply to the link check message. Upon receiving (at block 1300) the reply to the link check message from a replying vertex, which received the link check message, the entity vertex removes the replying vertex from the unlinked list because that replying vertex's reply demonstrates it is linked.

Figure 14:
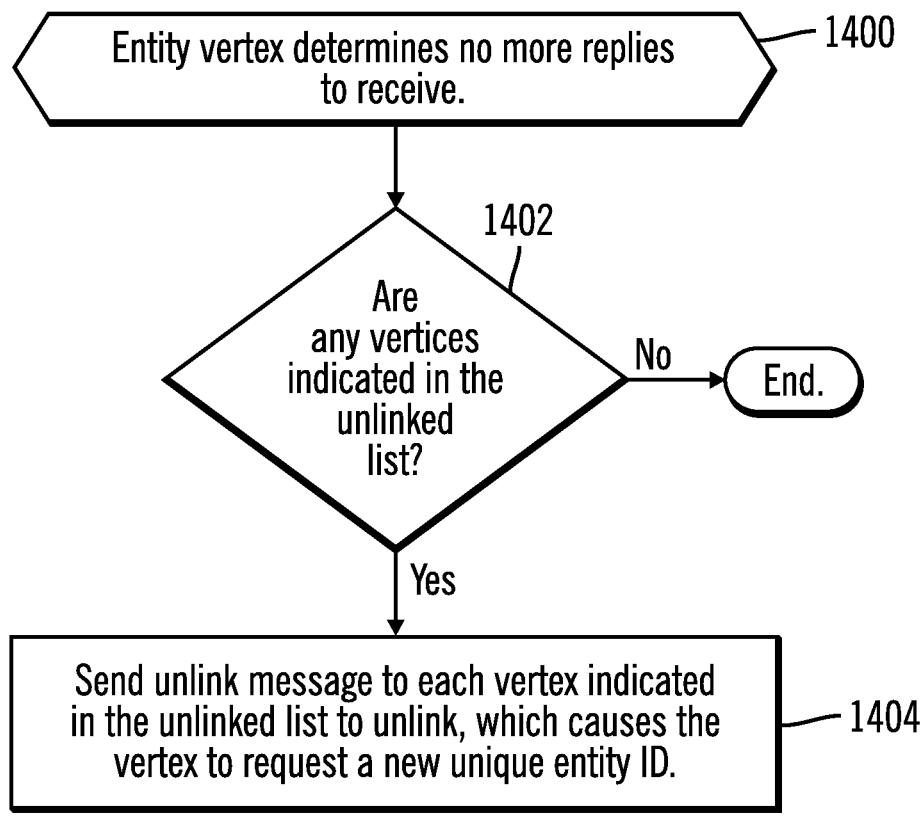

FIG. 14 illustrates an embodiment of operation performed by the entity vertex to process vertices in the unlinked list determined to not be linked to the entity vertex. Upon the entity vertex determining (at block 1400) that there are no more replies to receive, a determination is made (at block 1402) whether there are any vertices indicated in the unlinked list, which comprises vertices that have not been verified as directly or indirectly linked to the entity vertex. If (at block 1402) the unlinked list is empty, then control ends. If (at block 1402) the unlinked list is non-empty, then the entity vertex sends (at block 1402) an unlink message to each vertex indicated in the unlinked list to cause the recipient vertex to unlink. The vertex receiving the unlink message may request a new unique entity ID, which then makes that unlinked vertex no longer part of the group of vertices sharing the common entity ID of the entity vertex.

Described embodiments provide an entity resolution technique that allows vertices in an entity graph to update their entity information to the entity information of a directly linked vertex based on the self-information score of the directly linked vertex when the entity information of the directly linked record refers to another vertex comprising the entity vertex.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The reference characters used herein, such as i and n, are used herein to denote a variable number of instances of an element, which may represent the same or different values, and may represent the same or different value when used with different or the same elements in different described instances.

Figure 15:
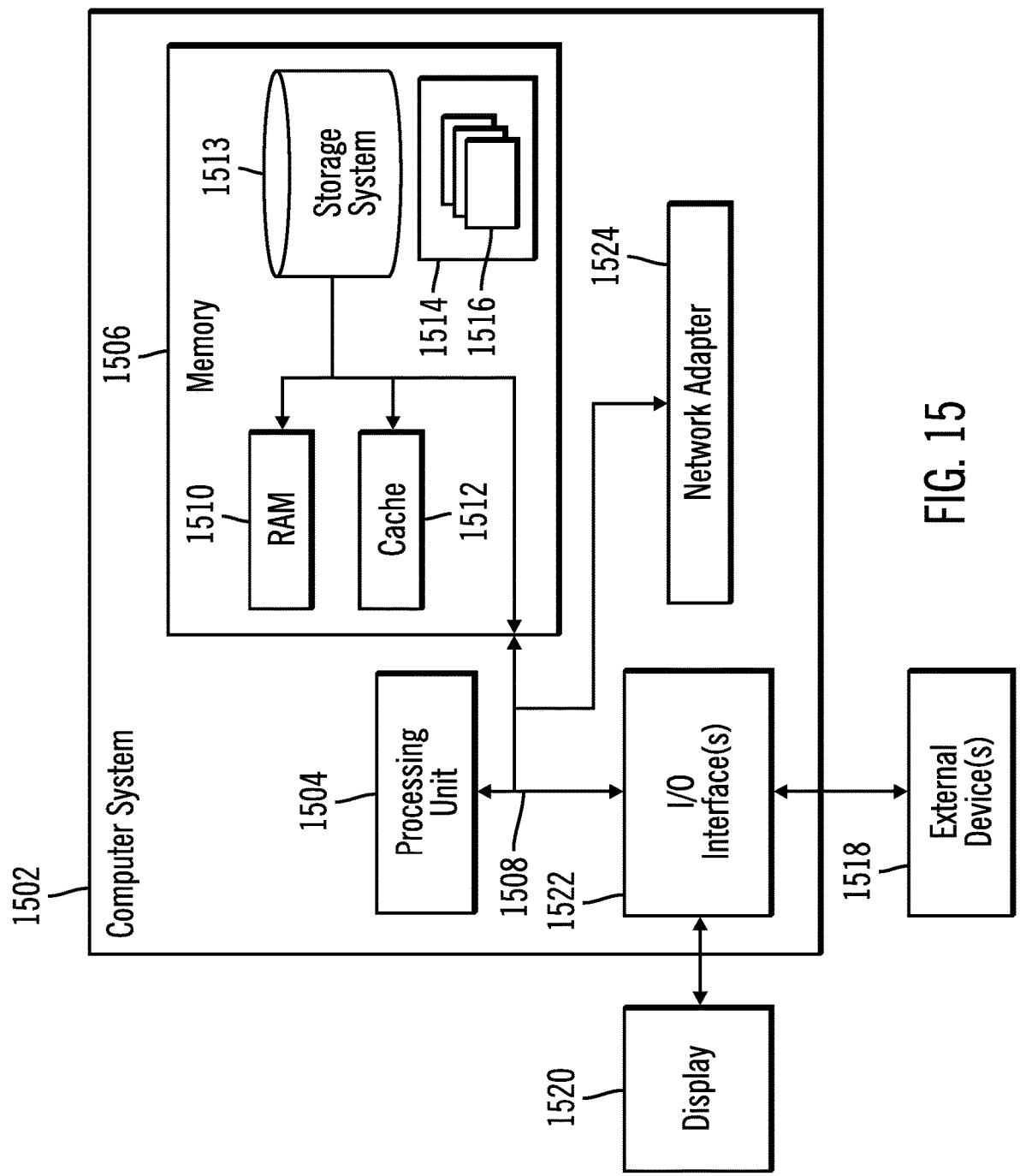
FIG. 15 illustrates an embodiment of an implementation of the database nodes of the described embodiments.

FIG. 15 illustrates an embodiment of a computer system 1502 which may comprise an implementation of the node 100. Computer system 1502 is only one example of a suitable computing node and is not intended to suggest any limitation as to the scope of use or functionality of embodiments of the invention described herein. Regardless, computer node 1502 is capable of being implemented and/or performing any of the functionality set forth hereinabove.

The computer node 1502 is operational with numerous other general purpose or special purpose computing system environments or configurations. Examples of well-known computing systems, environments, and/or configurations that may be suitable for use with computer node 1502 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1502 may be described in the general context of computer system executable instructions, such as program modules, being executed by a computer system. Generally, program modules may include routines, programs, objects, components, logic, data structures, and so on that perform particular tasks or implement particular abstract data types. Computer node 1502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer node 1502 is shown in the form of a general-purpose computing device. The components of computer system/server 1502 may include, but are not limited to, one or more processors or processing units 1504, a system memory 1506, and a bus 1508 that couples various system components including system memory 1506 to processor 1504.

Bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1502 typically includes a variety of computer system readable media. Such media may be any available media that is accessible by computer node 1502, and it includes both volatile and non-volatile media, removable and non-removable media, and may be used for storing the programs and data used by the programs.

System memory 1506 can include computer system readable media in the form of volatile memory, such as random access memory (RAM) 1510 and/or cache memory 1512. Computer node 1502 may further include other removable/non-removable, volatile/non-volatile computer system storage media. By way of example only, storage system 1513 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1508 by one or more data media interfaces. As will be further depicted and described below, memory 1506 may include at least one program product having a set (e.g., at least one) of program modules that are configured to carry out the functions of embodiments of the invention.

Program/utility 1514, having a set (at least one) of program modules 1516, may be stored in memory 1506 by way of example, and not limitation, as well as an operating system, one or more application programs, other program modules etc., and program data. Each of the operating system, one or more application programs, other program modules, and program data or some combination thereof, may include an implementation of a networking environment. Program modules 1516 generally carry out the functions and/or methodologies of embodiments of the invention as described herein.

Computer node 1502 may also communicate with one or more external devices 1518 such as a keyboard, a pointing device, a display 1520, etc.; one or more devices that enable a user to interact with the computer node 1502; and/or any devices (e.g., network card, modem, etc.) that enable computer system/server 1502 to communicate with one or more other computing devices. Such communication can occur via Input/Output (I/O) interfaces 1522. Still yet, computer node 1502 can communicate with one or more networks such as a local area network (LAN), a general wide area network (WAN), and/or a public network (e.g., the Internet)

via network adapter 1524. As depicted, network adapter 1524 communicates with the other components of computer system/server 1502 via bus 1508. It should be understood that although not shown, other hardware and/or software components could be used in conjunction with computer system/server 1502. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for entity resolution of records in a database, the computer program product comprising a non-transitory computer readable storage medium having computer readable program code to perform operations, the operations comprising:

maintaining, for each pair of two records of a plurality of pairs of two records, a relationship value indicating an extent to which the two records in the pair are related;

maintaining record information for each record of a plurality of records indicating a self-information score based on content in the record, an entity identifier of an entity assigned to the record, and an entity information score of a record comprising a proxy for the entity, wherein two or more records having a same entity identifier are resolved to a same entity identified by the entity identifier;

for a subject record, determining a target record having a relationship value with the subject record satisfying a threshold and having an entity information score greater than the entity information score of the subject record; and setting the entity identifier and entity information of the subject record score to the entity identifier and entity information score of the determined target record.

2. The computer program product of claim 1, wherein the setting the entity identifier and entity information score of the subject record to the entity identifier and entity information score of the target record is performed in response to the target record self-information score being less than the subject record self-information score minus a threshold.

3. The computer program product of claim 1, wherein the subject record has relationship values with a plurality of target records satisfying the threshold, wherein the determined target record comprises the target record having a highest entity information score of the target records.

4. The computer program product of claim 3, wherein the operations further comprise:

updating an entity identifier and entity information score of other of the target records related to the subject record not having the highest entity information score to the entity identifier and entity information score of the determined target record having the highest entity information score.

5. The computer program product of claim 1, wherein an entity record comprises a record having a record identifier and self-information score equal to the entity identifier and the entity information score in the subject record, wherein the subject record is one of:

directly linked to the entity record by having a relationship value with the entity record satisfying the threshold; and indirectly linked to the entity record through at least one other record including the target record by having a relationship value with the entity record that does not satisfy the threshold, wherein at least one of the at least one other record including the target record indirectly linked has a relationship value with the entity record and the subject record that satisfies the threshold.

6. The computer program product of claim 5, wherein the operations further comprise:

in response to detecting a change to the records, determining whether any records are not directly nor indirectly linked to a record having a same self-information score as the entity information score in the records; and assigning a new entity identifier to each of the determined records not directly or indirectly linked to the record having the entity information score.

7. The computer program product of claim 6, wherein the operations further comprise:

for each determined record assigned the new entity identifier, determining a target record having a relationship value with the determined record satisfying a threshold that also has an entity information score greater than the entity information score of the determined record; and setting the entity identifier and entity information of the determined record score to the entity identifier and entity information score of the target record in response to a comparison of the target record self-information score and the subject record self-information score satisfying a criteria to perform entity resolution for the subject record.

8. A system for entity resolution of records in a database, comprising:

a processor; and a non-transitory computer readable storage medium having computer readable program code embodied therein that when executed by the processor performs operations, the operations comprising:

maintaining, for each pair of two records of a plurality of pairs of two records, a relationship value indicating an extent to which the two records in the pair are related;

maintaining record information for each record of a plurality of records indicating a self-information score based on content in the record, an entity identifier of an entity assigned to the record, and an entity information score of a record comprising a proxy for the entity, wherein two or more records having a same entity identifier are resolved to a same entity identified by the entity identifier;

for a subject record, determining a target record having a relationship value with the subject record satisfying a threshold and having an entity information score greater than the entity information score of the subject record; and setting the entity identifier and entity information score of the subject record to the entity identifier and entity information score of the determined target record.

9. The system of claim 8, wherein the setting the entity identifier and entity information of the subject record score to the entity identifier and entity information score of the target record is performed in response to the target record self-information score being less than the subject record self-information score minus a threshold.

10. The system of claim 8, wherein the subject record has relationship values with a plurality of target records satisfying the threshold, wherein the determined target record comprises the target record having a highest entity information score of the target records.

11. The system of claim 10, wherein the operations further comprise:

updating an entity identifier and entity information score of other of the target records related to the subject record not having the highest entity information score to the entity identifier and entity information score of the determined target record having the highest entity information score.

12. The system of claim 8, wherein an entity record comprises a record having a record identifier and self-information score equal to the entity identifier and the entity information score in the subject record, wherein the subject record is one of:

directly linked to the entity record by having a relationship value with the entity record satisfying the threshold; and indirectly linked to the entity record through at least one other record including the target record by having a relationship value with the entity record that does not satisfy the threshold, wherein at least one of the at least one other record including the target record indirectly linked has a relationship value with the entity record and the subject record that satisfies the threshold.

13. The system of claim 12, wherein the operations further comprise:

in response to detecting a change to the records, determining whether any records are not directly nor indirectly linked to a record having a same self-information score as the entity information score in the records; and assigning a new entity identifier to each of the determined records not directly or indirectly linked to the record having the entity information score.

14. The system of claim 13, wherein the operations further comprise:

for each determined record assigned the new entity identifier, determining a target record having a relationship value with the determined record satisfying a threshold that also has an entity information score greater than the entity information score of the determined record; and setting the entity identifier and entity information score of the determined record to the entity identifier and entity information score of the target record in response to a comparison of the target record self-information score and the subject record self-information score satisfying a criteria to perform entity resolution for the subject record.

15. A method for entity resolution of records in a database, comprising:

maintaining, for each pair of two records of a plurality of pairs of two records, a relationship value indicating an extent to which the two records in the pair are related;

maintaining record information for each record of a plurality of records indicating a self-information score based on content in the record, an entity identifier of an entity assigned to the record, and an entity information score of a record comprising a proxy for the entity, wherein two or more records having a same entity identifier are resolved to a same entity identified by the entity identifier;

for a subject record, determining a target record having a relationship value with the subject record satisfying a threshold and having an entity information score greater than the entity information score of the subject record; and setting the entity identifier and entity information of the subject record score to the entity identifier and entity information score of the determined target record.

16. The method of claim 15, wherein the setting the entity identifier and entity information of the subject record score to the entity identifier and entity information score of the target record are performed in response to the target record self-information score being less than the subject record self-information score minus a threshold.

17. The method of claim 15, wherein the subject record has relationship values with a plurality of target records satisfying the threshold, wherein the determined target record comprises the target record having a highest entity information score of the target records.

18. The method of claim 17, further comprising:
updating an entity identifier and entity information score of other of the target records related to the subject record not having the highest entity information score to the entity identifier and entity information score of the determined target record having the highest entity information score.

19. The method of claim 15, wherein an entity record comprises a record having a record identifier and self-information score equal to the entity identifier and the entity information score in the subject record, wherein the subject record is one of:
   directly linked to the entity record by having a relationship value with the entity record satisfying the threshold; and
   indirectly linked to the entity record through at least one other record including the target record by having a relationship value with the entity record that does not satisfy the threshold, wherein at least one of the at least one other record including the target record indirectly linked has a relationship value with the entity record and the subject record that satisfies the threshold.

20. The method of claim 15, further comprising:
in response to detecting a change to the records, determining whether any records are not directly nor indirectly linked to a record having a same self-information score as the entity information score in the records; and
assigning a new entity identifier to each of the determined records not directly or indirectly linked to the record having the entity information score.

21. The method of claim 20, further comprising:
for each determined record assigned the new entity identifier, determining a target record having a relationship value with the determined record satisfying a threshold that also has an entity information score greater than the entity information score of the determined record; and
setting the entity identifier and entity information score of the determined record to the entity identifier and entity information score of the target record in response to a comparison of the target record self-information score and the subject record self-information score satisfying a criteria to perform entity resolution for the subject record.

* * * * *